United States Patent [19]

Hikone et al.

[11] Patent Number: 4,978,138
[45] Date of Patent: Dec. 18, 1990

[54] VEHICULAR SAFETY ARRANGEMENT FOR DRIVER'S SEAT

[75] Inventors: Makoto Hikone, Yokosuka; Kouzo Maeda, Yokohama; Masanobu Yoshioka, Yokosuka, all of Japan

[73] Assignee: Nissan Motor Co., Ltd., Kanagawa, Japan

[21] Appl. No.: 446,742

[22] Filed: Dec. 6, 1989

[30] Foreign Application Priority Data

Dec. 16, 1988 [JP] Japan .............................. 63-162352[U]

[51] Int. Cl.⁵ ........................ B60R 21/05; B62D 1/19
[52] U.S. Cl. .................................. 280/777; 280/780; 180/90
[58] Field of Search ............... 280/777, 779, 780; 180/90; 74/492

[56] References Cited

U.S. PATENT DOCUMENTS

| | | | |
|---|---|---|---|
| 3,392,599 | 7/1968 | White | 280/777 |
| 3,907,326 | 9/1975 | Arntson et al. | 180/90 |
| 3,938,821 | 2/1976 | Haas et al. | 180/90 |
| 4,000,876 | 1/1977 | Usui et al. | 280/780 |
| 4,194,411 | 3/1980 | Manabe et al. | 74/492 |
| 4,228,695 | 10/1980 | Trevisson et al. | 280/777 |
| 4,773,674 | 9/1988 | Wierschem | 280/777 |
| 4,786,076 | 11/1988 | Wierschem | 280/777 |

FOREIGN PATENT DOCUMENTS 5350978  7/1975  Japan .

Primary Examiner—Charles A. Marmor
Assistant Examiner—Tamara L. Finlay
Attorney, Agent, or Firm—Pennie & Edmonds

[57] ABSTRACT

A safety arrangement for a driver's seat in an automotive vehicle having a steering column extending to the driver's seat. The safety arrangement is comprised of a column bracket to which the steering column is secured. The column bracket is slidably secured to a sliding block 5 fixed to vehicle body side. The column bracket is put into a slidable condition under the action of a solenoid when a driver is restrained by a seat belt, while into a fixed condition under the action of the solenoid when the driver is released from the seat belt. The column bracket is moved forward together with the steering column when an impact force is applied to a knee protector, thereby absorbing impact energy while withdrawing the steering column. Even under the fixed condition of the column bracket, an impact force applied to the steering column can be effectively absorbed by an energy absorbing mechanism provided between the steering column and the column bracket.

8 Claims, 7 Drawing Sheets

VEHICULAR SAFETY ARRANGEMENT FOR DRIVER'S SEAT

BACKGROUND OF THE INVENTION

1. Field of the Invention

This invention relates to a vehicular safety arrangement for protecting a driver in a driver's seat of a vehicle during vehicle collision, and more particularly to improvements in the safety arrangement to improve impact energy absorption ability particularly when the driver is not restrained by a seat belt.

2. Description of the Prior Art

A variety of safety arrangements have been proposed and put into practical use as disclosed, for example, in Japanese Utility Model Provisional Publication Nos. 57-47477, 56-6668, and 56-16580 and Japanese Utility Model Publication No. 53-50978 and Japanese Patent Provisional Publication No. 50-43633. Of these Publications, the Japanese Utility Model Provisional Publication No. 57-47477 discloses a safety arrangement as shown in FIGS. 9 and 10 of the drawings of the present application. This safety arrangement is mounted in a passenger compartment and located opposite to a driver's seat. The safety arrangement includes a supporting member 103 which is adapted to support a steering column 101 to a vehicle body 105 in a manner to be movable forward and rearward relative to the vehicle. A knee protector 107 is fixed to the intermediate part of the steering column 101 so as to be opposite to the knees of the driver.

With this conventional arrangement, during vehicle collision, an impact energy of the driver's knees is transmitted through the knee protector 107 to the supporting member 103 thereby causing the steering column 101 to move axially forward relative to the vehicle body 105. At this time, impact energy absorption can be accomplished by the impact absorbing member 109, thereby protecting the driver's knees. Besides, since the steering column 101 is withdrawn, the driver's head is prevented from interference with the steering wheel even if his neck is bent as shown in FIG. 10, thereby protecting the driver's upper half body.

In case of a commercial vehicle of the type wherein the driver frequently repeats ride-in and get-off actions, for example, to deliver goods, the vehicle may sometimes run in a condition the driver is not restrained by the seat belt. If a vehicle collision occurs at such a time, the driver's knees will first strike against the knee protector 107 and then his upper half body comes into collision with the steering wheel which is moving after the steering column 101 moves forward upon impact of the knees with the knee protector. Then impact absorption is accomplished by the impact absorbing member 109. However, it is to be noted that impact absorption for the driver's upper half body cannot be accomplished from the beginning of movement of the steering column, but is accomplished in the course of movement of the steering column 101 which movement is caused by the movement of the knee protector 107. This shortens an impact-absorbing stroke or impact-absorbing time. In view of the above, in order to achieve a sufficient impact-absorption under a condition the driver is not restrained by the seat belt, it is required to make the impact absorbing member large-sized; however this degrades freedom of design of the vicinity of an instrument panel provided with a plurality of operational parts.

SUMMARY OF THE INVENTION

It is an object of the present invention to provide an improved vehicular safety arrangement for a driver's seat, which can sufficiently protect a driver or vehicle passenger during vehicle collision regardless of his restrained and not-restrained conditions by a seat belt, without rendering it large-sized.

Another object of the present invention is to provide an improved vehicular safety arrangement for a driver's seat, provided with a device for accomplishing a sufficient impact absorption during vehicle collision, even in a condition the driver or vehicle passenger is not restrained by a seat belt.

A vehicular safety arrangement of the present invention is for a driver's seat to which a steering column extends. The vehicular safety arrangement is comprised of a first device for axially movably supporting the steering column to the side of a vehicle body. The first device takes a first condition for allowing axial movement of the steering column and a second condition for preventing the axial movement of the steering column. A knee protector is such provided that the knee of the driver is strikable against it under vehicle collision. A second device is provided to put the first device into the first condition under application of an impact force over a predetermined level when a driver is restrained by a seat belt and into the second condition even under application of the impact force when the driver is released from the seat belt. A third device for applying the impact force to the steering column under the first condition, when the knee of the driver strikes against the knee protector. A fourth device is provided to absorb an axial impact force input to the steering column under the second condition of the second device.

Accordingly, when the driver is restrained by the seat belt, the steering column is allowed to move axially. As a result, the moving energy of the driver's knee is transmitted through the knee protector to the steering column and therefore the steering column moves forward relative to the vehicle. When the driver is released from the seat belt, the steering column is prevented from its axial movement. Accordingly, even if the driver strikes against the knee protector, the steering column cannot withdraw and therefore the impact force of the driver's upper half body can be completely applied to the steering column. The thus applied impact force is effectively absorbed by the third (impact force absorbing) device. Thus, according to the present invention, the knee, the breast and the upper half body (particularly the head) of the driver can be effectively protected from being injured during vehicle collision regardless of the driver's restrained and not-restrained conditions by the seat belt, while rendering the safety arrangement small-sized.

BRIEF DESCRIPTION OF THE DRAWINGS

In the drawings, the like reference numerals designate the like elements and parts throughout all the figures, in which.

DETAILED DESCRIPTION OF THE INVENTION

Figure 1:
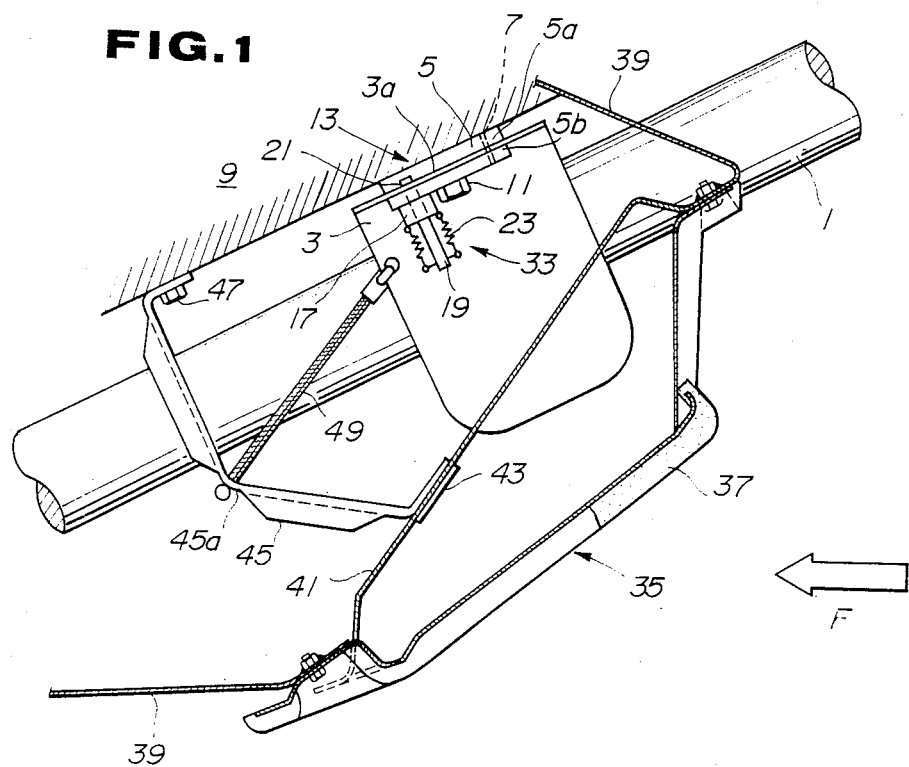
FIG. 1 is a side view, partly in section, of a vehicular safety arrangement in accordance with the present invention.
Figure 2:
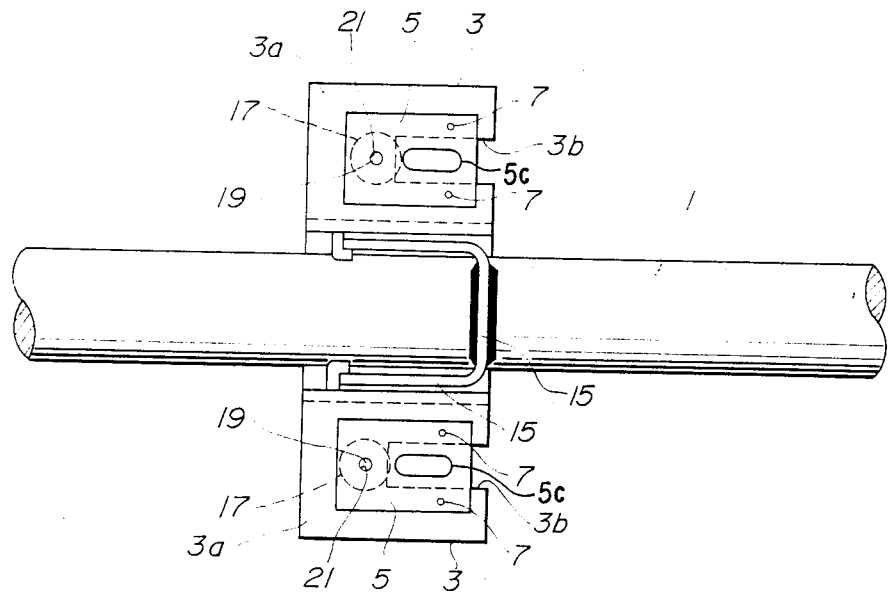
FIG. 2 is a bottom view of an essential part of the safety arrangement of FIG. 1, illustrating an operational mode of an energy absorbing mechanism.

Referring now to FIGS. 1 to 5, there is shown an embodiment of a safety arrangement for a driver's seat, in accordance with the present invention. The safety arrangement of this instance is installed in an automotive vehicle and comprises a column bracket 3 for supporting a steering column 1. The steering column 1 is provided at its one (upper) end with a steering wheel (not shown) and at the other end thereof with a steering gear (not shown) mechanically connected to steerable road wheels (not shown). A pair of sliding blocks 5 are installed to the column bracket 3 through plastic pins 7. The sliding blocks 5 are located on the opposite sides of the steering column 1 as shown in FIG. 2. Each sliding block 5 includes upper and lower section 5a, 5b between which a base plate section 3a of the column bracket 3 is securely put as shown in FIG. 1. The sliding block 5 is fixedly secured to a stay 9 on the side of a vehicle body (not shown) by bolts 11, so that the column bracket base plate section 3a is fastened between the sliding block upper and lower sections 5a, 5b. Additionally, the column bracket 3 and the sliding block 5 are fixed with each other by means of the plastic pin 7 passing through them. The sliding block 5 is formed with an elongate hole 5c which extends along the axis of the steering column 1 as shown in FIG. 2. The bolt 11 passes through the elongate hole 5c and screwed into the vehicle body side stay 9. In connection with this, the column bracket base plate section 3a is formed with elongate cutouts 3b each of which extends along the axis of the steering column 1 and reaches an end of the base plate section 3a on the side of the steering wheel, so that the bolt 11 will get out of the cutout 3b when the column bracket base plate section 3a moves toward the side of the steering gear or leftward in FIG. 2. Thus, the column bracket 3, the sliding block 5 and the bolt 11 constitute a supporting unit 13 for a steering column 1.

Figure 3:
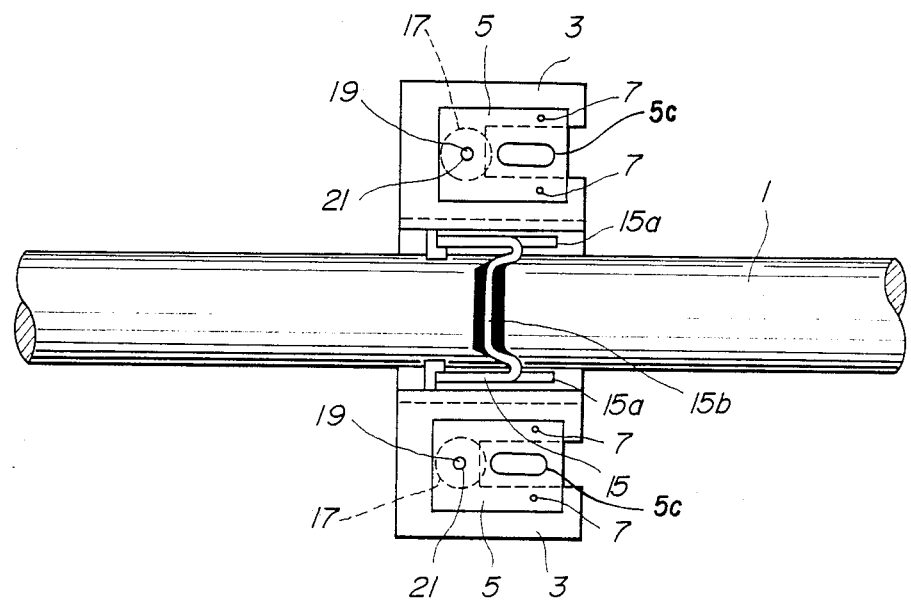
FIG. 3 is a bottom view similar to FIG. 2 but illustrating another operational mode of the energy absorbing mechanism.

As shown in FIG. 2, the steering column 1 is installed to the column bracket 3 through a tearable plate 15 serving as an energy absorbing mechanism. The tearable plate 15 includes base sections 15a, 15a which are located on the opposite sides of the steering column 1 and fixed to the column bracket 3 by means of bolts or the likes. A support section 15b having a U-shaped cross-section bridges the base sections 15a, 15a over the steering column 1. The support section 15b is integral with the base section 15a, 15a and welded to the lower side peripheral surface of the steering column 1. The tearable plate 15 is adapted to be torn up as shown in FIG. 3 when the steering column 1 moves leftward in FIG. 2, thus absorbing energy applied to the steering column 1.

Figure 4:
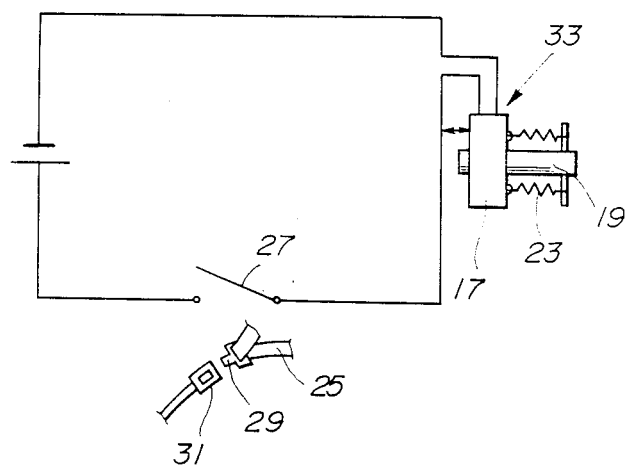
FIG. 4 is a circuit diagram for a solenoid used in the safety arrangement of FIG. 1.

A solenoid 17 incorporates a movable shaft 19 and is fixed to the sliding block 5 in such a manner that the movable shaft 19 can be inserted into or withdrawn from a hole 21 passing through the sliding block 5 and the column bracket base plate section 3a. The movable shaft 19 is usually biased in the direction to be inserted into the hole 21 under action of biasing means such as a spring 23. Accordingly, the movable shaft 19 is inserted into the hole 21 when the solenoid 17 is deenergized. As shown in FIG. 4, the solenoid 17 is electrically connected with a belt switch 27 of a seat belt 25 for restraining a driver or passenger of the vehicle. The belt switch 27 is adapted to be switched ON in a driver restrained condition in which a tongue 29 of the seat belt 25 is inserted into a buckle 31. When the belt switch 27 is switched ON, the solenoid 17 is energized thereby to withdraw the movable shaft 19 from the hole 21 against the bias of the spring 23. Under a driver released condition in which the tongue 29 gets out of the buckle 31, the belt switch 27 is switch OFF and therefore the solenoid 17 is deenergized so that the movable shaft 9 is inserted into the hole 21 under the bias of the spring 23. Thus, the solenoid 17 and the movable shaft 19 constitute a change-over device 33 adapted to enable the steering column 1 to move and disable the same from moving relative to the sliding block 5.

Figure 5:
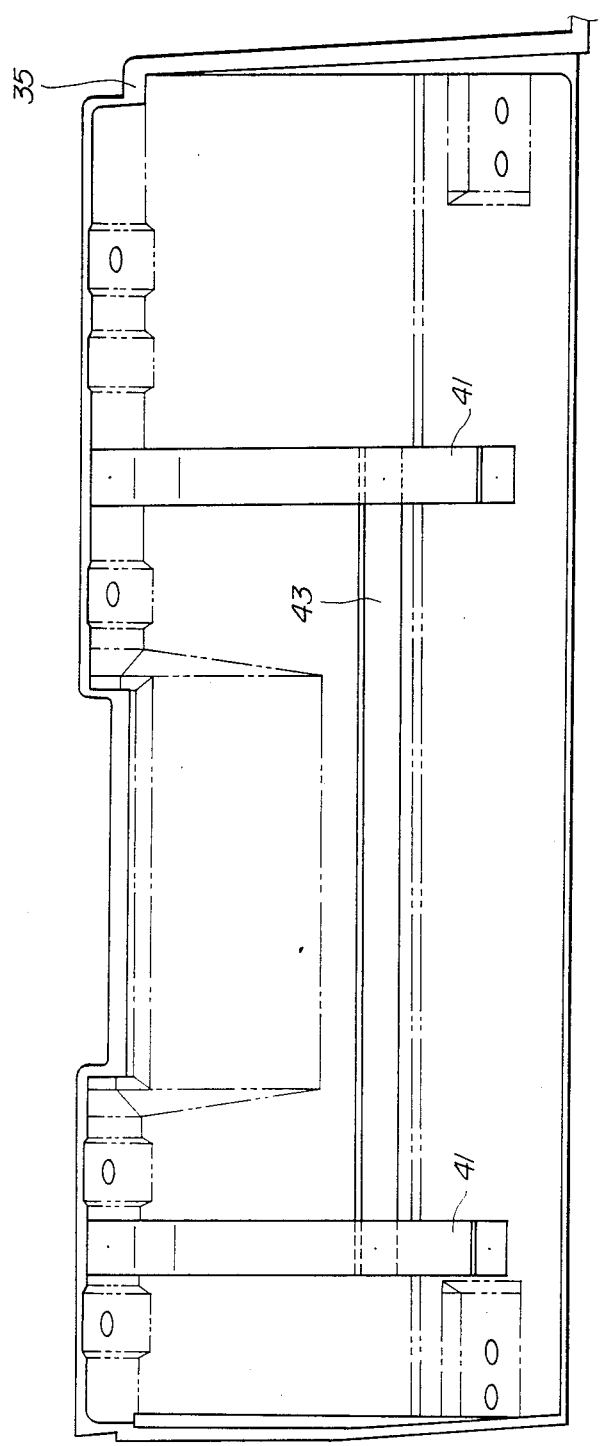
FIG. 5 is an illustration of a knee protector used in the safety arrangement of FIG. 1.

A knee protector 35 is provided under the steering column 1 and at a position opposite to the knees of the driver or passenger. As shown in FIG. 5, the knee protector 35 extends laterally or in the direction of width of the vehicle. The surface (on the side of the driver) of the knee protector 35 is covered with a damping material 37 such as polyurethane resin so as to protect the driver's knees from damaging during vehicle collision. The knee protector 35 is installed to the vehicle body through support brackets 39. As shown in FIGS. 1 and 5, first reinforcement members 41 are welded to the knee protector 35. Additionally, a second reinforcement member 43 is welded to the first reinforcement members 41, 41 in a manner to bridge the first reinforcement members 41, 41 which are located far from each other as clearly shown in FIG. 5.

Bent arm members 45 are located on the opposite sides of the steering column 1 and fixedly disposed between the second reinforcement member 43 and the vehicle body side stay 9. More specifically, each bent arm member 45 is welded at one end section to the second reinforcement member 43 and fixed at the other end section to the stay 9 by means of a bolt 47. The bent arm member 45 is formed with a bent portion 45a which is lower in rigidity than other parts thereof. The bent portion 45a is located at a generally intermediate position of the bent arm member 45, i.e., at a generally intermediate position between the second reinforcement member 43 and the stay 9. Additionally, a tension member 49 is disposed connecting the bent portion 45a of the bend arm member 45 and the column bracket 3. More specifically, the tension member 49 in this instance is formed of a straight elongate wire. The tension member 49 has one end section securely connected to the bent portion 45a of the bent arm member 45 and the other end section connected to the column bracket 3 so that the bent arm member 45 and the column bracket 3 are connected with each other under tension.

Figure 6:
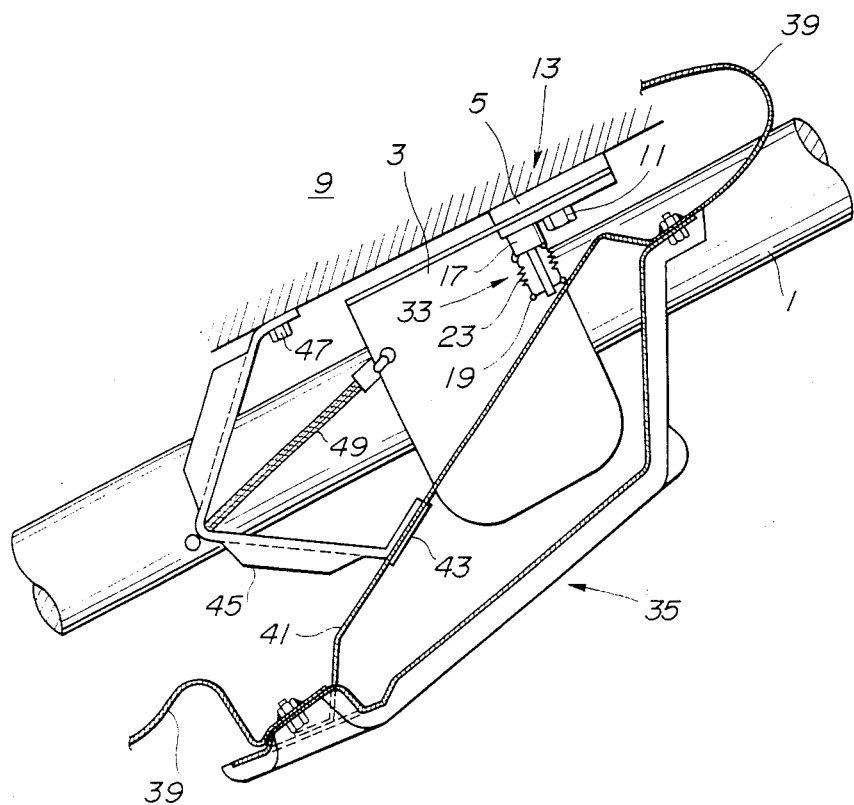
FIG. 6 is a side view similar to FIG. 1 but illustrating an operational mode of the safety arrangement of FIG. 1.

The manner of operation of the thus configured seat belt arrangement will be discussed hereinafter also with reference to FIG. 6.

Under the driver restrained condition in which the belt switch 27 is switched ON, the movable shaft 19 is withdrawn from the hole 21 of the column bracket 3 and the sliding block 5 under the action of the solenoid 17. Then the column bracket 3 is secured to the sliding block 5 under connection by the plastic pin 7 and under friction by sandwiching connection between the sliding block 5 and the column bracket 3 with the bolt 11.

When the driver's knees move forward during collision of the vehicle, the knees are received by the knee protector 35 so as to be protected with the damping material 37, in which an impact force F is damped. In case that the impact force F is considerably large, it is transmitted from the knee protector 35 through the first and second reinforcement members 41, 43 to the bent arm member 45, accompanied by the forward deformation of the support bracket 39. At this time, the bent arm member 45 is further bent at the bent portion 45a, so that the bent portion 45a moves forward as shown in FIG. 6. As a result, the column bracket 3 is pulled forward through the tension member 49, shearing the plastic pin 7. Then the column bracket 3 is removed from the sliding block 5 and is moved forward relative to the vehicle. Accordingly the impact force F of the driver's knees is absorbed under the deformation of the bent arm member 45 and the support bracket 39 and the removal of the column bracket 3 from the sliding block 5. Furthermore, the forward movement of the column bracket 3 relative to the vehicle causes the steering column 1 and the steering wheel to move forward relative to the vehicle. Thus the upper half (particularly the head) of the driver's body can be effectively protected from striking against the steering wheel.

Under the driver released condition in which the belt switch is switched OFF, the movable shaft 19 is inserted into the hole 21 of the column bracket 3 and the sliding block 5 under the bias of the spring 23, so that the bracket 3 is being fixed to the sliding block 5. When the upper half (particularly the breast) of the driver's body strikes the steering wheel during vehicle collision, the impact force applied to steering wheel is transmitted through the steering column 1 to the tearable plate 15, so that the steering column 1 moves forward of the vehicle, accompanied by tearing-up of the tearable plate 15 as shown in FIG. 3. As a result, the driver's impact energy upon vehicle collision is effectively absorbed even when the driver or passenger is released from restraint of the seat belt. In this case, the steering column 1 is prevented from moving prior to striking of the upper half of the driver's body against the steering column and wheel, and therefore absorption of the moving energy of the upper half of the driver's body can start from the beginning of movement of the steering column 1.

Additionally, even in case that a trouble happens to the solenoid 17, the movable shaft 19 is kept inserted into the hole 21 of the column bracket 3 and the sliding block 5 under the bias of the spring 23. As a result, the above-discussed effect under the driver released condition can be obtained, thereby providing a good energy absorbing effect.

Figure 7:
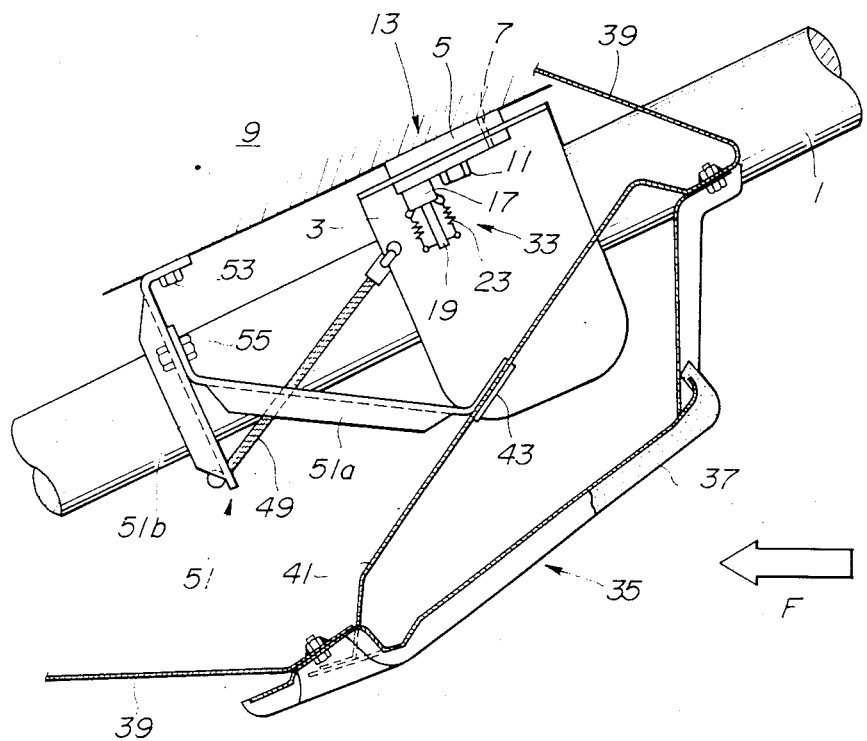
FIG. 7 is a side view of another embodiment of the vehicular safety arrangement in accordance with the present invention, illustrating an operational mode thereof.
Figure 8:
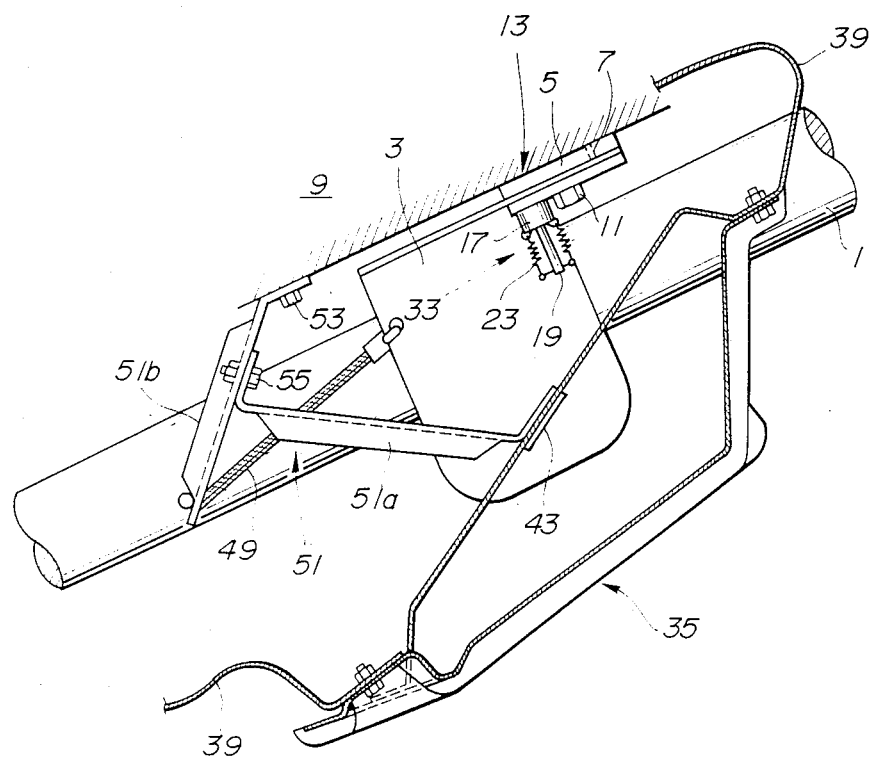
FIG. 8 is the side view similar to FIG. 7, illustrating another operational mode of the safety arrangement.
Figure 9:
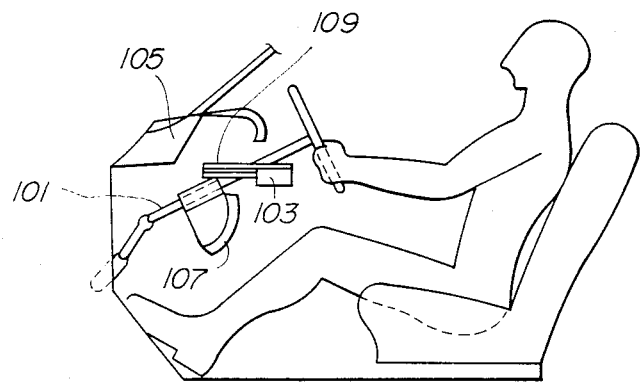
FIG. 9 is a schematic view of a conventional vehicular safety arrangement, illustrating an operational mode thereof.
Figure 10:
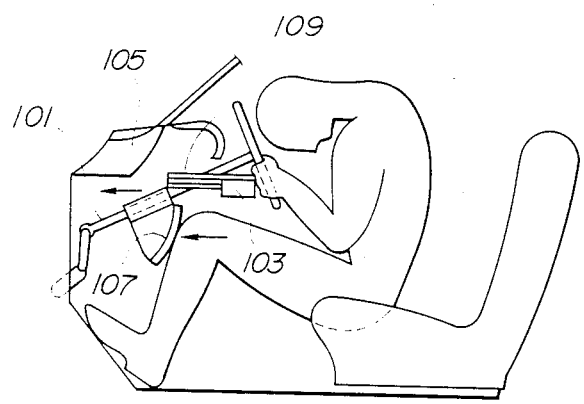
FIG. 10 is a schematic view similar to FIG. 9 but illustrating another operational mode of the conventional safety arrangement.

FIG. 7 illustrates another embodiment of the safety arrangement according to the present invention, which is similar to the embodiment of FIGS. 1 to 6 with the exception that the bent arm member 45 is replaced with a deformable structure 51. The deformable structure 51 includes a load receiving member 51a and a support member 51b which are independent from each other. The load receiving member 51a is welded at one end thereof with the second reinforcement member 43 and fixedly secured by means of a bolt 55 to the support member 51b at a position near the vehicle body side stay 9. The support member 51b is fixedly secured at one end thereof with the vehicle body side stay 9 by means of a bolt 53. The other end section of the support member 51b is connected through the tension member 49 with the column bracket 3.

With this configuration, in case that vehicle collision occurs under the driver restrained condition, the driver's knees strike against the knee protector 35, so that an impact force of the driver's knees is transmitted through the first and second reinforcement members 41, 43 to the load receiving member 51a of the deformable structure 51. This causes the support member 51b of the deformable structure 51 to move forward relative to the vehicle. As a result, the column bracket 3 is pulled forward relative to the vehicle through the tension member 49, thereby effectively absorbing the impact energy during the vehicle collision. The forward movement of the column bracket 3 causes the steering wheel to move forward relative to the vehicle, thereby protecting the vehicle driver or passenger. Thus, according to this embodiment, the steering column 1 can be largely moved even under a smaller displacement of the knee protector 35, in addition to providing the same effects as in the embodiment of FIGS. 1 to 6. It will be understood that when a vehicle collision occurs under the driver released condition, this embodiment will achieve the same effect as in the embodiment of FIGS. 1 to 6, thereby effectively absorbing impact energy during vehicle collision.

WHAT IS CLAIMED IS:

1. A vehicular safety arrangement for a driver's seat to which a steering column extends, said vehicular safety arrangement comprising:
    means for axially movably supporting the steering column to side of a vehicle body, said supporting means taking a first condition for allowing axial movement of the steering column and a second condition for preventing the axial movement of the steering column;
    a knee protector against which a knee of the driver is strikable under vehicle collision;
    means for putting said supporting means into said first condition under application of an impact force over a predetermined level when the driver is restrained by a seat belt and into said second condition even under application of said impact force when the driver is released from the seat belt;
    means for applying said impact force to said steering column under said first condition, when the knee of the driver strikes against said knee protector; and
    means for absorbing an axial impact force input to the steering column under said second condition of said supporting means.

2. A vehicular safety arrangement as claimed in claim 1, wherein said absorbing means includes means for allowing the steering column to axially move relative to said supporting means upon input of said axial impact force.

3. A vehicular safety arrangement as claimed in claim 2, wherein said steering column axial movement allowing means includes a tearable plate structure connecting said steering column and said column bracket, said tearable plate being tearable upon input of said axial impact force.

4. A vehicular safety arrangement as claimed in claim 1, wherein said supporting means includes a sliding base fixed to the vehicle body side, and a column bracket slidably fixed to said sliding base, said steering column being fixedly secured to the column bracket.

5. A vehicular safety arrangement as claimed in claim 4, wherein said putting means includes locking means for locking said sliding base and said column bracket when the driver is released from the seat belt, and for allowing a relative sliding movement of said column bracket to said sliding base when the driver is restrained by the seat belt.

6. A vehicular safety arrangement as claimed in claim 5, wherein said locking means includes means defining a hole formed through said column bracket and said sliding base, a movable shaft insertable into said hole to lock said column bracket and said sliding base, and means for inserting said movable shaft into said hole when the driver is released from the seat belt and for withdrawing said movable shaft from said hole when the driver is restrained by the seat belt.

7. A vehicular safety arrangement as claimed in claim 4, wherein said impact force applying means includes means for pulling said column bracket in direction of axis of said steering column when the knee of the driver strikes against said knee protector.

8. A vehicular safety arrangement as claimed in claim 6, wherein said column bracket pulling means includes a generally L-shaped bendable member fixedly disposed between said knee protector and the vehicle body side, and a connecting member for connecting said bendable member with said column bracket.

* * * * *